C. L. GREENE.
LINE HOLDER.
APPLICATION FILED APR. 17, 1915.
1,163,531. Patented Dec. 7, 1915.
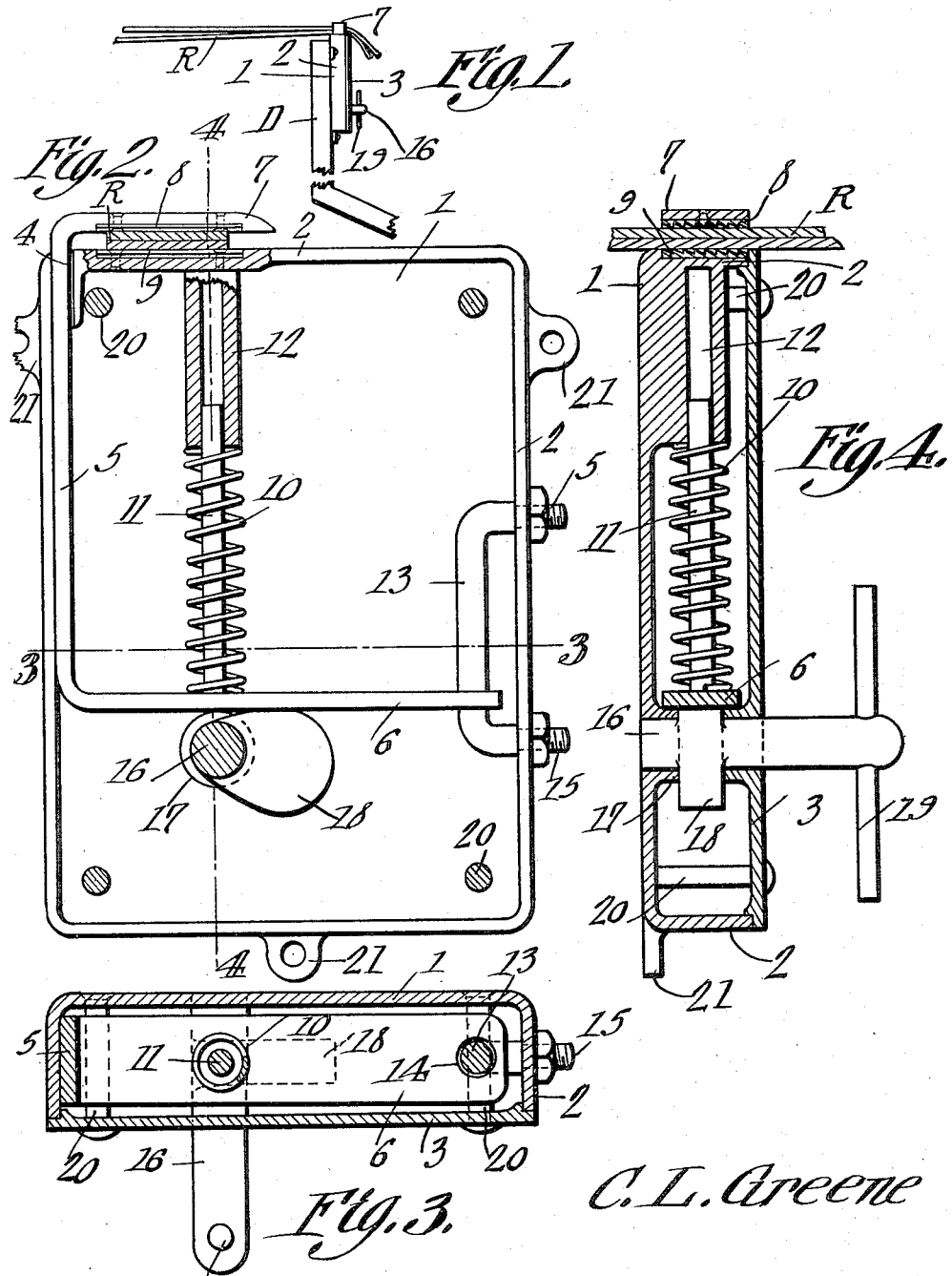
C. L. Greene
Inventor
Witnesses
by
Attorneys

UNITED STATES PATENT OFFICE.

CHARLES LEE GREENE, OF CUSTER, MONTANA.

LINE-HOLDER.

1,163,531. Specification of Letters Patent. Patented Dec. 7, 1915.

Application filed April 17, 1915. Serial No. 22,136.

*To all whom it may concern:*

Be it known that I, CHARLES LEE GREENE, a citizen of the United States, residing at Custer, in the county of Yellowstone and State of Montana, have invented a new and useful Line-Holder, of which the following is a specification.

This invention relates to rein holders and more particularly to that type adapted to be secured to the dash-board of an animal-drawn vehicle, or any suitable part of the vehicle which is readily accessible from the driver's seat, to there remain ready to hold the harness reins when desired.

One object of the invention is to provide a rein-holder so constructed that the stress imparted to its gripping jaws will be uniformly distributed within the rein-holder.

Another object of the invention is to provide a rein-holder of general improved construction, whereby the device will be simple, durable and inexpensive in manufacture, as well as convenient, practical, serviceable and efficient in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiments in the accompanying drawings, wherein:—

Figure 1 is an elevation of the rein-holder depicting it applied to the dash board of a vehicle. Fig. 2 is a face view of the rein-holder with its cover plate removed and parts shown in section. Fig. 3 is a transverse sectional view of the rein-holder taken on the line 3—3 of Fig. 2; and Fig. 4 is a longitudinal sectional view of the rein-holder taken on the line 4—4 of Fig. 2.

In carrying out the invention, there is provided a casing or housing 1, having a peripheral flange 2 and a removable cover-plate 3.

A slot 4 is formed at one corner of the casing 1, to slidably receive the intermediate portion 5 of a U-shaped gripping member, which intermediate portion 5 has a relatively long arm 6, extending perpendicularly from its inner end and a relatively short arm 7 extending perpendicularly from its outer end, which is exterior of the casing 1. This arm or jaw 7 has secured within a recess 7' formed in its inner face, a toothed strip 8 which is designed to coöperate with a similar toothed strip 9, which is secured within a recess 2' formed in the upper end portion of the peripheral flange 2.

In order to yieldingly hold the toothed strips 8 and 9 in engagement, a helical compression spring 10, is placed upon a rod 11, which is rigidly secured to and extends perpendicularly from the long arm 6 of the U-shaped gripping member, while the other end of the rod 11 is slidably received in an elongated apertured guide lug 12, which is formed in the casing 1. The tension of the spring 10 will normally urge the arm or jaw 7 toward the toothed strip 9 with sufficient force to securely grip the harness reins therebetween.

To uniformly distribute the stress that is imparted to the U-shaped gripping member through the instrumentality of the short arm 7, by any pulling or tugging action on the reins R, the long arm 6 is extended entirely across the casing 1, to slidably engage a guide member 13. This guide member 13 passes through an aperture 14 formed at the outer end of the arm 6, said guide member having its perpendicular threaded terminals 15 secured to the peripheral flange of the casing 1, by means of nuts or the like. It is obvious that this arrangement will materially reinforce or strengthen the rein-holder, also facilitate its operation, inasmuch as the friction at the slot 4 and apertured lug 12 is appreciably reduced.

In order to cause the jaw 7 and toothed strip 8 to move away from the toothed strip 9, thereby releasing the reins R, there is provided a transverse shaft 16 which is rotatably mounted in bearings 17 formed in the casing 1 adjacent the arm 6. A pear-shaped cam 18 is secured to the shaft 16, within the casing 1, while a transverse aperture is formed in the shaft 16, exterior of the casing, for the reception of a manipulating handle 19.

The cover-plate 3 and the casing 1 are secured together by means of a rivet or screw 20, while the completed rein-holder may be secured to the dash board D, or any suitable part of a vehicle, by means of screws or the like which pass through apertured lugs 21, that extend from the peripheral flange 2 of the casing 1.

In practical operation, after the rein-holder has been properly secured to any suitable part of an animal drawn vehicle, the reins may be inserted between the toothed strips 8 and 9 by rotating the shaft 16, which causes the cam 18 to rotate, thereby raising the long arm 6, the intermediate portion 5 and the short arm or jaw 7 of the U-shaped gripping member, together with the toothed strip 8, away from the toothed strip 9, sufficient to receive the reins R. The driver then releases the handle 19 which allows the spring 10 to cause the toothed strips 8 and 9 to securely grip the reins R and hold the same until they are again to be employed in driving the draft animal. To release the reins R, it is only necessary to repeat the above operation.

It will be observed that by placing the toothed strips 8 and 9 within the recesses 7' and 2', so that their teeth lie even or flush with the adjacent faces of the arm 7 and flange 2, that the upper face of the flange 2 may be employed to readily guide the reins R to and between the toothed strips 8 and 9.

Having thus described the invention, what is claimed as new is:

1. A rein-holder including a casing; a spring pressed sliding gripping jaw, comprising a relatively long arm, an intermediate portion and a relatively short arm; a toothed strip secured to the short arm; a toothed strip secured to the casing to coöperate with the toothed strip which is secured to the short arm; a U-shaped guide member slidably engaged by the long arm of the sliding gripping member, said guide member being rigidly secured to the casing; a shaft rotatably mounted in said casing; a cam secured to said shaft for actuating the sliding gripping member; and a manipulating handle secured to said shaft.

2. A rein-holder including a casing; a U-shaped gripping member slidably mounted in the casing, said gripping member comprising an intermediate portion, a relatively long arm extending perpendicularly therefrom and having an aperture formed in its outer end, and a relatively short arm extending perpendicularly from said intermediate portion; a toothed member secured to the relatively short arm; a toothed member secured to the casing, said toothed members adapted to coöperate to grip the reins therebetween; an elongated rod extending perpendicularly from the relatively long arm; a spring mounted on said rod to normally hold the toothed members in engagement; a U-shaped guide member passing through the aperture of the relatively long arm to slidably guide the U-shaped gripping member; a shaft rotatably mounted in the casing; a cam secured to said shaft to engage and actuate the U-shaped gripping member; and a manipulating handle secured to the shaft.

3. A rein-holder including a casing having an aperture formed in the outer face thereof; a U-shaped gripping member slidably mounted in the casing, said gripping member comprising an intermediate portion; a relatively long arm extending perpendicularly therefrom and having an aperture formed in its outer end, and a relatively short arm extending perpendicularly from the intermediate portion, said short arm having a recess formed in its inner face; a toothed member received by and secured within said recess; a toothed member received by and secured within the aperture formed in the casing, said toothed members adapted to coöperate to grip the reins therebetween; an elongated rod extending perpendicularly from the relatively long arm; a spring mounted on said rod to normally hold the toothed members in engagement; a U-shaped guide member passing through the aperture of the relatively long arm to slidably guide the U-shaped gripping member; a shaft rotatably mounted in the casing; a cam secured to said shaft to engage and actuate the U-shaped gripping member; and a manipulating handle secured to the shaft.

In testimony that I claim the foregoing as my own, I have hereto affixed my signature in the presence of two witnesses.

CHARLES LEE GREENE.

Witnesses:
CLAUDE L. HEREN,
HARRY F. SCOTT.

Copies of this patent may be obtained for five cents each, by addressing the "Commissioner of Patents, Washington, D. C."